(12) United States Patent
Kobayashi et al.

(10) Patent No.: US 10,771,749 B2
(45) Date of Patent: Sep. 8, 2020

(54) ELECTRONIC APPARATUS, DISPLAY SYSTEM, AND CONTROL METHOD OF ELECTRONIC APPARATUS

(71) Applicant: SEIKO EPSON CORPORATION, Tokyo (JP)

(72) Inventors: Toshiya Kobayashi, Sapporo (JP); Makoto Shigemitsu, Sapporo (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/364,642

(22) Filed: Mar. 26, 2019

(65) Prior Publication Data
US 2019/0306476 A1 Oct. 3, 2019

(30) Foreign Application Priority Data
Mar. 27, 2018 (JP) .................. 2018-059602

(51) Int. Cl.
| | |
|---|---|
| *G06F 3/033* | (2013.01) |
| *H04N 9/31* | (2006.01) |
| *G06F 3/02* | (2006.01) |
| *G06F 3/041* | (2006.01) |
| *G06F 3/0354* | (2013.01) |

(52) U.S. Cl.
CPC ......... *H04N 9/3138* (2013.01); *G06F 3/0213* (2013.01); *G06F 3/033* (2013.01); *G06F 3/0354* (2013.01); *G06F 3/0412* (2013.01); *G06F 3/0416* (2013.01)

(58) Field of Classification Search
CPC ...... G06F 3/0213; G06F 3/033; G06F 3/0346; G06F 3/0354
See application file for complete search history.

(56) References Cited

U.S. PATENT DOCUMENTS

| | | |
|---|---|---|
| 2004/0070564 A1 | 4/2004 | Dawson et al. |
| 2006/0139327 A1 | 6/2006 | Dawson et al. |
| 2013/0241820 A1* | 9/2013 | Keh ...................... G06F 3/1454 345/156 |

* cited by examiner

*Primary Examiner* — Ryan D Howard
(74) *Attorney, Agent, or Firm* — Oliff PLC (57) ABSTRACT

A terminal apparatus includes a wireless communication unit that communicates with a projector; an operation detection unit that detects an operation; and an operation data processing unit that causes the wireless communication unit to transmit operation data designating a display position of a pointer to the projector, when the projector displays the pointer according to an operation of a pointing device based on the operation detected by the operation detection unit.

12 Claims, 8 Drawing Sheets

ELECTRONIC APPARATUS, DISPLAY SYSTEM, AND CONTROL METHOD OF ELECTRONIC APPARATUS

CROSS-REFERENCE

The entire disclosure of Japanese Patent Application No. 2018-059602, filed Mar. 27, 2018 is expressly incorporated by reference herein.

BACKGROUND

1. Technical Field

The present invention relates to an electronic apparatus, a display system, a control method of an electronic apparatus, and a program.

2. Related Art

In related art, for a system combining a display apparatus with an electronic apparatus, there is known a technique for moving a pointer or a cursor displayed by the display apparatus in accordance with a movement of the electronic apparatus (for example, see U.S. Patent Publication No. 2004/0070564). In the system described in U.S. Patent Publication No. 2004/0070564, the relative coordinate of the remote controller with respect to the display apparatus is specified by specifying the initial position of the remote controller using the cradle and detecting the movement of the remote controller from the initial position.

In the related system described above, information indicating a movement of the remote controller is provided to the display apparatus, and the display apparatus three-dimensionally calculates the position and orientation of the remote controller. For this reason, it is a problem that a load of processing on the display apparatus is increased.

SUMMARY

An advantage of some aspects of the invention is to suppress a processing load of a display apparatus in a process of changing a display of the display apparatus in response to an operation at an electronic apparatus.

An electronic apparatus according to an aspect of the invention includes a communication unit that communicates with a display apparatus, an operation detection unit that detects an operation, and an operation data processing unit that causes the communication unit to transmit operation data for designating a display position of a pointer of a case of displaying the pointer according to an operation of a pointing device by the display apparatus, to the display apparatus based on the operation detected by the operation detection unit.

With this configuration, the electronic apparatus transmits operation data for designating the display position of the pointer when the display apparatus displays the pointer according to the operation of the pointing device to the display apparatus. Therefore, the display apparatus can easily specify the display position of the pointer based on the operation data transmitted from the electronic apparatus. As a result, it is possible to suppress the load of the processing when the display apparatus displays the pointer.

In the aspect of the invention, the operation data processing unit may be configured to obtain a display position after a movement of the pointer corresponding to the operation detected by the operation detection unit, and cause the communication unit to transmit the operation data relating to the movement of the pointer on the display apparatus.

With this configuration, the electronic apparatus obtains the display position after the movement when the pointer is moved in accordance with the movement of the electronic apparatus, and transmits the operation data to the display apparatus. Therefore, the display apparatus can obtain the display position after the movement from the operation data when moving the display position of the pointer. As a result, the load of the processing when the display apparatus moves the display position of the pointer can be further reduced.

In the aspect of the invention, the operation data processing unit may be configured to obtain the display position after the movement of the pointer corresponding to the operation detected by the operation detection unit based on a setting value of an area in which the display apparatus displays the pointer.

With this configuration, the electronic apparatus can obtain the display position of the pointer corresponding to the area where the display apparatus displays the pointer. Therefore, since the display apparatus may display the pointer according to the operation data, the load of the processing of the display apparatus can be further reduced.

In the aspect of the invention, the display apparatus may be configured to include a storage unit that stores the setting value of the area in which the display apparatus displays the pointer, and a setting unit that sets a setting value to be stored in the storage unit, and the operation data processing unit may be configured to obtain the display position after the movement of the pointer corresponding to the operation detected by the operation detection unit, based on the setting value stored in the storage unit.

With this configuration, the electronic apparatus can easily obtain the display position of the pointer corresponding to the display area of the display apparatus.

In the aspect of the invention, the operation data processing unit may be configured to cause the communication unit to transmit the operation data indicating an amount and an orientation of the movement of the display position of the pointer.

With this configuration, the display apparatus can easily obtain the amount and the orientation of the movement for moving the display position of the pointer from the operation data, thereby suppressing the processing load of the display apparatus.

In the aspect of the invention, the operation data processing unit may be configured to cause the communication unit to transmit the operation data indicating the display position after the movement of the pointer.

With this configuration, the display apparatus can easily obtain the display position after the movement of the pointer from the operation data. Therefore, the display apparatus can promptly move the display position of the pointer.

In the aspect of the invention, a video output unit that outputs a video to the display apparatus may be further included.

With this configuration, it is possible to suppress the load of the display apparatus when the display apparatus displays the video and the pointer that the electronic apparatus outputs.

A display system according to an aspect of the invention includes a display apparatus and an electronic apparatus, in which the display apparatus includes a display unit, a first communication unit that receives operation data transmitted from the electronic apparatus, and a display control unit that causes the display unit to display a pointer indicating an operation position of a pointing device, based on the operation data received by the first communication unit, and the electronic apparatus includes a second communication unit that communicates with the display apparatus, an operation detection unit that detects an operation, and an operation data processing unit that causes the second communication unit to transmit the operation data for designating a display position of the pointer displayed by the display apparatus to the display apparatus, based on the operation detected by the operation detection unit.

With this configuration, the electronic apparatus transmits the operation data for designating the display position of the pointer when the display apparatus displays the pointer according to the operation of the pointing device to the display apparatus. Therefore, the display apparatus can easily specify the display position of the pointer based on the operation data transmitted from the electronic apparatus. As a result, it is possible to suppress the load of the processing for the display apparatus to display the pointer.

A control method of an electronic apparatus that communicates with a display apparatus according to an aspect of the invention includes detecting an operation, and transmitting operation data for designating a display position of a pointer of a case displaying the pointer according to an operation of a pointing device by the display apparatus, to the display apparatus, based on the detected operation.

With this configuration, the electronic apparatus transmits operation data for designating the display position of the pointer when the display apparatus displays the pointer according to the operation of the pointing device to the display apparatus. Therefore, the display apparatus can easily specify the display position of the pointer based on the operation data transmitted from the electronic apparatus. As a result, it is possible to suppress the load of the processing when the display apparatus displays the pointer.

A program according to an aspect of the invention is a program executable by a computer that controls an electronic apparatus that communicates with a display apparatus, causes the computer to function as an operation data processing unit that transmits operation data for designating a display position of a pointer of a case of displaying the pointer according to an operation of a pointing device by the display apparatus, to the display apparatus, based on the operation detected by the operation detection unit.

According to the aspect of the invention, by executing the program by the computer, the electronic apparatus transmits the operation data for designating the display position of the pointer when the display apparatus displays a pointer according to the operation of the pointing device to the display apparatus. Therefore, the display apparatus can easily specify the display position of the pointer based on the operation data transmitted from the electronic apparatus. As a result, it is possible to suppress the load of the processing when the display apparatus displays the pointer.

The invention may be realized in various forms other than the electronic apparatus, the display system, the control method of the electronic apparatus, and the program described above. For example, the invention may be realized in the form of a recording medium on which the program is recorded, a server apparatus for distributing the program, a transmission medium for transmitting the program, a data signal embodying the program in a carrier wave, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment 1-1. Overall Configuration of Display System

Hereinafter, embodiments of the invention will be described with reference to the drawings.

Figure 1:
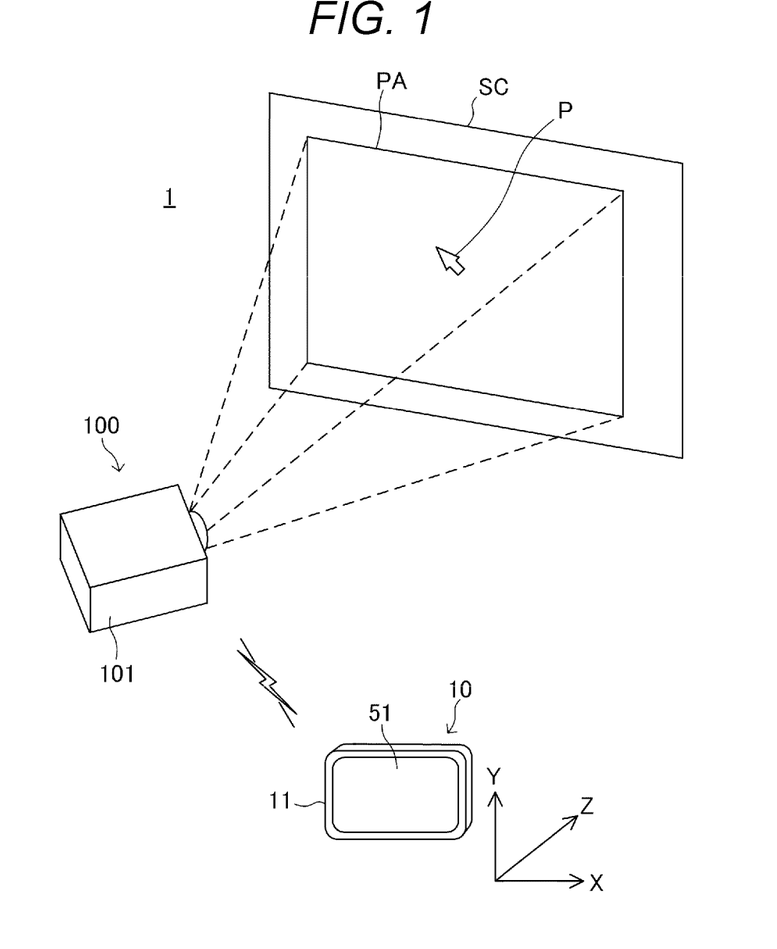
FIG. 1 is a diagram schematically showing a configuration of a display system according to a first embodiment.

FIG. 1 is a diagram schematically showing a configuration of a display system 1 according to a first embodiment. The display system 1 includes a terminal apparatus 10 as an example of an electronic apparatus and a projector 100 as an example of a display apparatus.

The terminal apparatus 10 is operated by a user, and is a portable phone such as a smartphone, a tablet computer, a personal computer, or the like, for example.

The terminal apparatus 10 includes a flat plate-shaped main body 11, and a touch panel 51 disposed on a surface of the main body 11. The touch panel 51 includes a display panel 52 (FIG. 3) that displays an image and a touch sensor 53 (FIG. 3) that detects a user's touch operation on a surface of the touch panel 51. A user operates the terminal apparatus 10 by bringing an indicator such as a finger into contact with the touch panel 51 of the terminal apparatus 10.

The terminal apparatus 10 detects a touch operation on the touch panel 51 and an operation of moving the main body 11. The terminal apparatus 10 includes a motion sensor 56 (FIG. 3) as a sensor for detecting the movement of the main body 11. The motion sensor 56 detects the movement based on the imaginary X, Y and Z axis set as indicated by arrows in FIG. 1. In the example of FIG. 1, the display system 1 includes a substantially rectangular touch panel 51, and the X axis is parallel to the long side direction of the touch panel 51, the Y axis is parallel to the short side direction of the touch panel 51, and the Z axis is perpendicular to the surface of the touch panel 51.

The projector 100 projects image light onto a projection target and forms an image on the surface of the projection target. FIG. 1 shows a configuration example in which the projector 100 projects onto a screen SC configured as a flat surface. The projection target onto which the image is projected by the projector 100 is not limited to the flat surface, and the screen SC may be a curtain or a wall surface, for example. The function and operation for projecting an image on the screen SC by the projector 100 correspond to "displaying" by the display apparatus.

The terminal apparatus 10 and the projector 100 are connected to each other so that various data can be transmitted and received by a wireless communication method. The terminal apparatus 10 and the projector 100 may use any communication method, and may adopt Bluetooth (registered trademark), wireless Local Area Network (LAN), or other wireless communication methods. Here, the wireless LAN includes Wi-Fi communication standardized by the Wi-Fi (registered trademark) Alliance. Further, the type and contents of data transmitted and received between the terminal apparatus 10 and the projector 100 are not particularly limited.

The projector 100 is connected to various devices serving as a video source, and projects an image based on the video data input from the video source onto the screen SC. The video source is a device for sending data to be displayed to the projector 100, and is a video reproducing device such as a Digital Versatile Disk (DVD) player, a personal computer, or the like. Further, the terminal apparatus 10 may also be connected to the projector 100 as a video source. In this case, the terminal apparatus 10 transmits the video data to the projector 100 by wireless communication with the projector 100. For example, the terminal apparatus 10 transmits video data to the projector 100 by Miracast (registered trademark).

In the display system 1, the projector 100 may be operated by the terminal apparatus 10. The projector 100 may execute a first operation mode of projecting a video onto the screen SC and a second operation mode of projecting (displaying) the pointer P onto the screen SC. In the first operation mode, the video based on the video data acquired from the video source is projected onto an image projection area PA. The image projection area PA is the maximum area where the projector 100 can project a video. In the second operation mode, the projector 100 displays the pointer P on the image projection area PA. The display position of the pointer P is movable within the image projection area PA.

The pointer P is a Graphical User Interface (GUI) displayed by a personal computer or the like in response to an operation of a pointing device, and is also referred to as a cursor, a mouse cursor, or the like. The shape of the pointer P is not particularly limited, and it may be an arrow shape as illustrated in FIG. 1, or another figure or image. Examples of the known pointing device include a mouse, a digitizer, a touch panel, a touch pad, a stylus pen, a track ball and the like.

In the present embodiment, the terminal apparatus 10 serves as the pointing device when the projector 100 executes the second operation mode. As described above, the terminal apparatus 10 detects the touch operation by the user and the operation of moving the main body 11. In the second operation mode, the projector 100 changes the display position of the pointer P in accordance with the touch operation on the touch panel 51 of the terminal apparatus 10 and the operation of moving the main body 11, and accordingly, the pointer P is moved.

In the display system 1, the terminal apparatus 10 generates operation data 36 indicating the display position of the pointer P (FIG. 3), and transmits the operation data 36 to the projector 100. The projector 100 determines the display position of the pointer P corresponding to the operation data, and moves the pointer P to the determined display position. Since the operation data 36 includes information for explicitly designating the display position of the pointer P with respect to the pointer P, there is an advantage that the load of the arithmetic processing for obtaining the display position of the pointer P by the projector 100 is small. These operations will be described below.

1-2. Configuration of Projector

Figure 2:
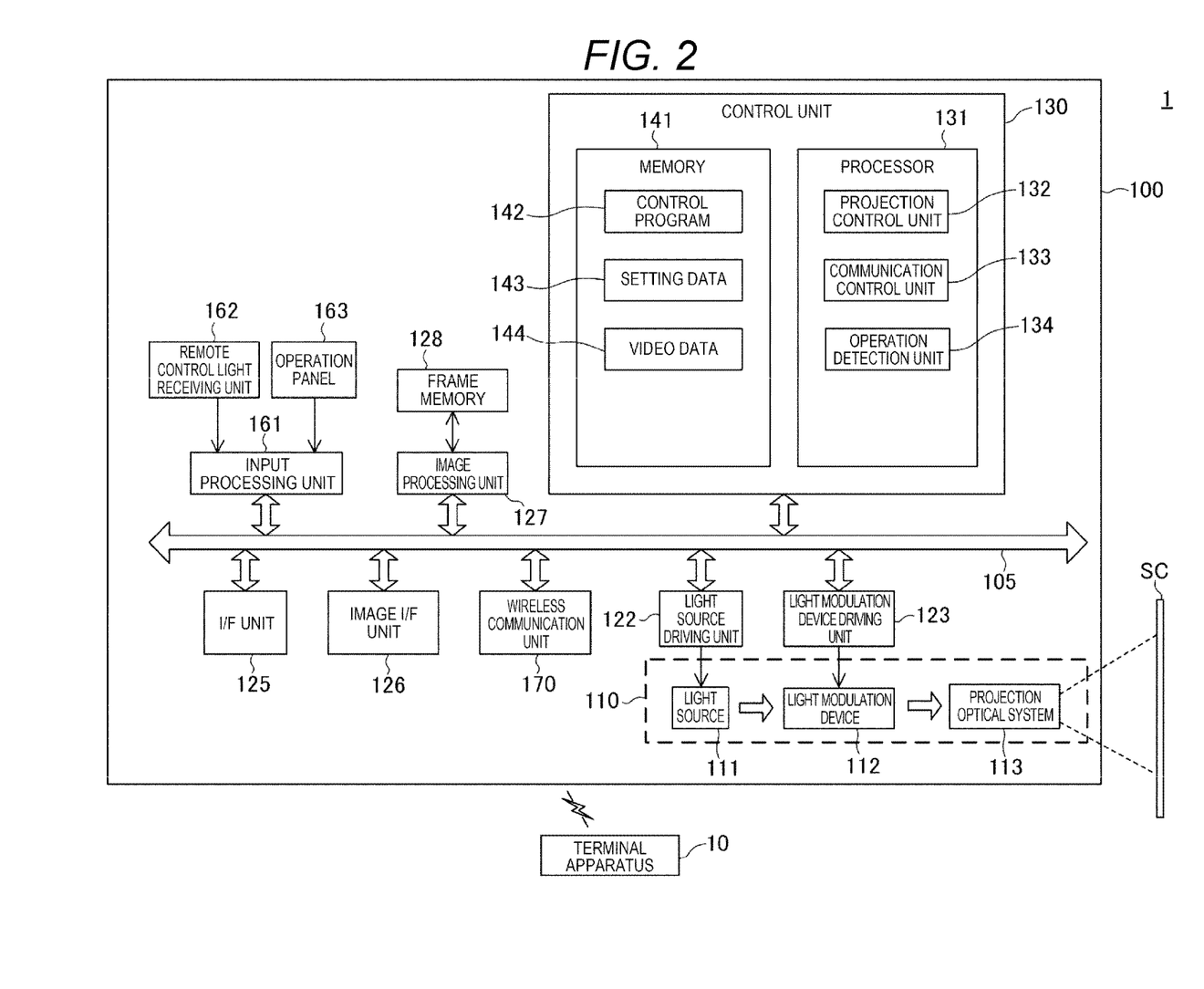
FIG. 2 is a block diagram showing a configuration of a display system.
Figure 3:
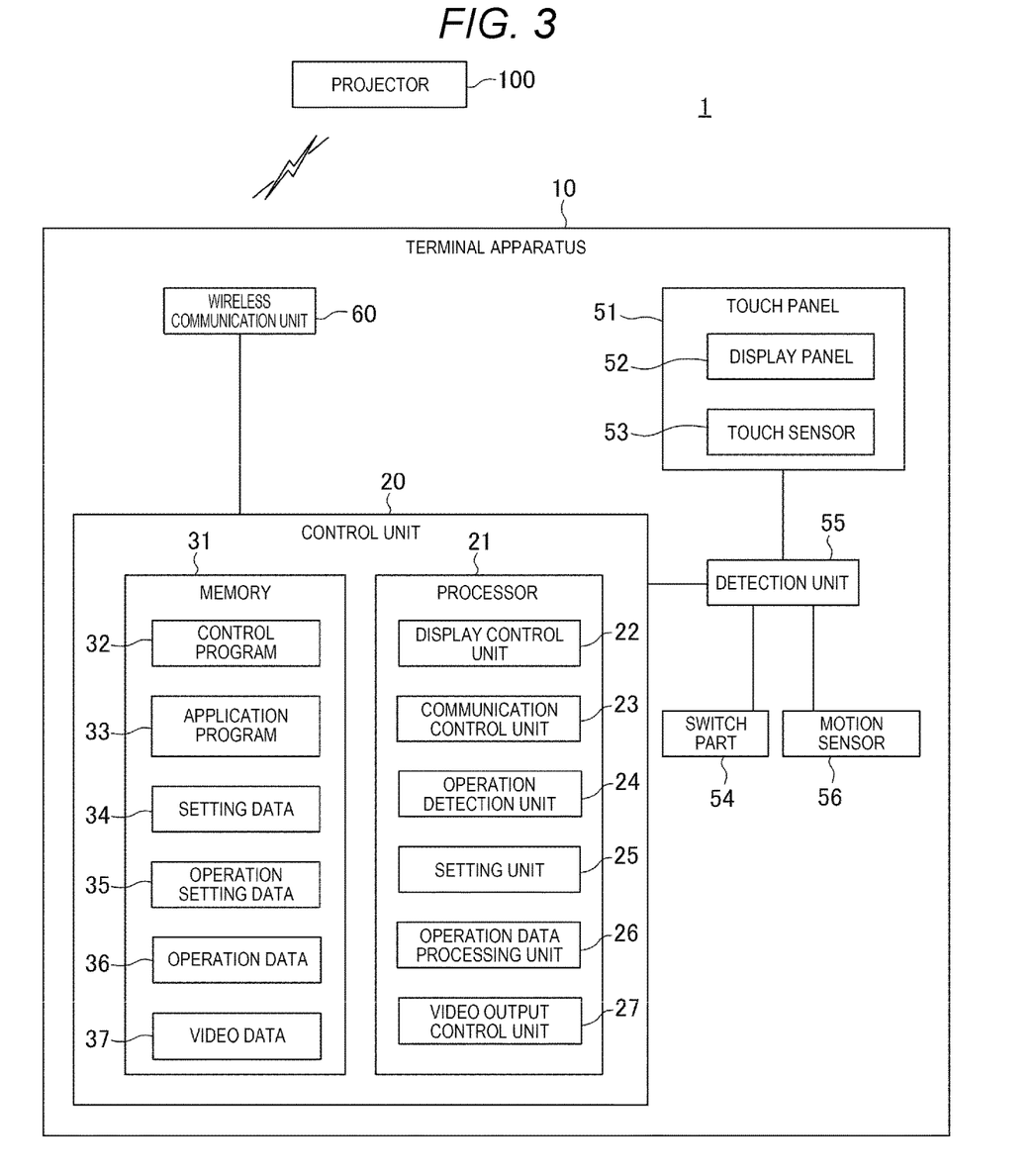
FIG. 3 is a block diagram showing a configuration of a display system.

FIG. 2 is a block diagram showing the configuration of the display system 1, and particularly, showing the configuration of the projector 100 in detail. FIG. 3 is a block diagram showing the configuration of the display system 1, and particularly, showing the configuration of the terminal apparatus 10 in detail.

First, the configuration of the projector 100 will be described with reference to FIG. 2.

The projector 100 includes an interface (I/F) unit 125 connected to an image supply apparatus. The I/F unit 125 includes a connector, an interface circuit, and the like, and may be connected to an external device by wire. For example, a personal computer, a Universal Serial Bus (USB) memory device, or the like is connected to the interface unit 125.

The projector 100 includes an image interface (I/F) unit 126. The image interface unit 126 includes a connector, an interface circuit, and the like, and may be connected to the video source device described above.

The projector 100 includes a projection unit 110, a light source driving unit 122, a light modulation device driving unit 123, an image processing unit 127, a control unit 130, and an input processing unit 161, and these units are communicably connected by a bus 105. As described below, the input processing unit 161 is connected to a remote control light receiving unit 162 and an operation panel 163. A frame memory 128 is connected to the image processing unit 127.

The projector 100 under the control of the control unit 130 causes the projection unit 110 to project an image based on the video data input from the video source.

The control unit 130 may select a digital video signal to be input to the I/F unit 125 as a video source. Further, the control unit 130 may select the video data received from the terminal apparatus 10 through the wireless communication unit 170 as a video source. In the present embodiment, when mirroring display is performed, the wireless communication unit 170 is selected as the video source.

The projection unit 110 (display unit) includes a light source 111, a light modulation device 112, and a projection optical system 113.

The light source 111 is configured of a lamp such as a halogen lamp, a xenon lamp, an extra-high pressure mercury lamp, or a solid light source such as a Light Emitting Diode (LED) or a laser light source. The light source 111 emits light with the power supplied from the light source driving unit 122. The light source driving unit 122 supplies a driving current and pulse to the light source 111. The light source driving unit 122 may have a function of adjusting the luminance of the light source 111 under the control of the control unit 130.

The light modulation device 112 modulates the light emitted from the light source 111 to generate image light and irradiates the projection optical system 113 with the image light. The light modulation device 112 may include a transmissive liquid crystal panel, a reflective liquid crystal panel, a digital mirror device (DMD), and the like as light modulation elements.

An image signal of an image to be rendered on the light modulation device 112 is input from the image processing unit 127 to the light modulation device driving unit 123. The light modulation device driving unit 123 drives the light modulation device 112 based on the image signal output from the image processing unit 127 to render an image on a frame (screen) basis. The light emitted from the light source 111 is modulated by the image rendered under the control of the light modulation device driving unit 123, and the modulated light is synthesized by a synthetic optical system such as a cross dichroic prism, and is emitted to the projection optical system 113.

The projection optical system 113 includes a lens and a mirror for focusing the light modulated by the light modulation device 112 on the screen SC. Further, the projection optical system 113 may include various lenses such as a zoom lens and a focus lens or lens groups.

The image processing unit 127 under the control of the control unit 130 acquires the video data from the selected video source and executes various image processing on the acquired video data. For example, the image processing unit 127 executes resolution conversion processing for converting the resolution of the video data in accordance with the display resolution of the light modulation device 112. Further, the image processing unit 127 executes a geometric correction processing for correcting the shape of the video data, a color tone correction process for correcting the color tone of the video data, and the like. The image processing unit 127 generates an image signal for displaying the processed video data and outputs the image signal to the light modulation device driving unit 123. When executing the image processing, the image processing unit 127 expands an image based on the video data acquired from the video source onto the frame memory 128, and executes various processing on the image expanded to the frame memory 128.

The control unit 130 includes a processor 131 including a Central Processing Unit (CPU), a microcomputer, and the like, and a memory 141. The memory 141 is a storage device that stores programs and data executed by the processor 131 in a nonvolatile manner, and includes a magnetic storage device, a semiconductor storage element such as a flash ROM, or another type of nonvolatile storage device, for example. The memory 141 may include a RAM that serves as a work area of the processor 131. The processor 131 may be a single processor or may have a configuration in which a plurality of processors serve as the processor 131.

The control unit 130 includes, as functional blocks, a projection control unit 132, a communication control unit 133, and an operation detection unit 134 which control each unit of the projector 100. These functional blocks are realized by the cooperation of software and hardware by the processor 131 executing the program stored in the memory 141.

The memory 141 stores data processed by the control unit 130 and programs executed by the processor 131. For example, the memory 141 stores a control program 142, setting data 143, and video data 144. The control program 142 is a program for the processor 131 to realize functions of the projection control unit 132, the communication control unit 133, and the operation detection unit 134.

The input processing unit 161 receives an operation by the user. The projector 100 includes the remote control light receiving unit 162 and the operation panel 163 as input means that is operated by the user. The remote control light receiving unit 162 receives an infrared signal transmitted from a remote controller (not shown), and decodes the received light signal. The operation panel 163 is installed in the main body 101 (FIG. 1), for example, and includes various switches for operating the projector 100, an indicator lamp indicating an operation state of the projector 100, and the like. The input processing unit 161 is connected to the remote control light receiving unit 162 and the operation panel 163, detects an operation on the operation panel 163, and outputs control data indicating the operated switch to the control unit 130. Further, the input processing unit 161 outputs data input from the remote control light receiving unit 162 to the control unit 130.

The wireless communication unit 170 (first communication unit) includes an antenna (not shown), a Radio Frequency (RF) circuit, and the like, and communicates with the terminal apparatus 10 in compliance with the wireless communication standard under the control of the control unit 130. The projector 100 and the terminal apparatus 10 are connected to each other so that various data can be transmitted and received by the wireless communication method.

As described above, the communication method implemented by the wireless communication unit 170 is wireless LAN (including Wi-Fi), Bluetooth, UWB, a wireless communication method using a mobile phone line, or the like, and not particularly limited.

The projection control unit 132 of the control unit 130 selects a video source. The projection control unit 132 can select a video source from among the device connected to the image interface unit 126, the device wirelessly connected to the wireless communication unit 170, and the video data 144 stored in the memory 141.

The projection control unit 132 (display control unit) controls the image processing unit 127 to render an image in the frame memory 128 based on the video data input from the video source or the video data 144 of the memory 141. The projection control unit 132 controls the light modulation device driving unit 123 to render the image rendered in the frame memory 128 on the light modulation device 112. As a result, the image rendered on the light modulation device 112 is projected onto the screen SC as a projection image through the projection optical system 113.

The communication control unit 133 controls the wireless communication unit 170 to perform wireless communication with the terminal apparatus 10. When establishing communication with the terminal apparatus 10, the communication control unit 133 executes a predetermined communication protocol and executes transmission of a beacon, reception of various requests transmitted from the terminal apparatus 10, and the like. The operation of establishing communication between the terminal apparatus 10 and the projector 100 will be described below with reference to the sequence diagram.

After establishing communication with the terminal apparatus 10, the communication control unit 133 causes the wireless communication unit 170 to receive the data transmitted from the terminal apparatus 10, and causes the memory 141 to store the received data. The projection control unit 132 retrieves the data received by the wireless communication unit 170 from the memory 141, and controls the image processing unit 127 and the projection unit 110. As a result, an image is projected onto the screen SC based on the data transmitted from the terminal apparatus 10.

The operation detection unit 134 detects the operation of the remote control light receiving unit 162 and the operation of the operation panel 163 based on the data input from the input processing unit 161.

The setting data 143 includes setting values related to the operation of the projector 100. The setting values included in the setting data 143 are the content of image processing executed by the image processing unit 127, parameters used for processing of the image processing unit 127, and the like, for example.

Further, the setting data 143 may include a setting value related to the communication made by the wireless communication unit 170 and various data acquired by the communication control unit 133. For example, the setting data 143 includes information on the terminal apparatus 10 with which the projector 100 communicates. More specifically, it may include a network address, identification information, other information, and the like of the terminal apparatus 10. In addition, the setting data 143 may include information for authentication, such as a password used for wireless communication with the terminal apparatus 10, and the like.

The video data 144 is data received from a video source by the projector 100 or video data stored in the projector 100 in advance. The projector 100 may select the video data 144 as the video source and project the video based on the video data 144.

1-3. Configuration of Terminal Apparatus

As shown in FIG. 3, the terminal apparatus 10 includes a control unit 20 that controls each unit of the terminal apparatus 10. The control unit 20 includes a processor 21 including a CPU, a microcomputer, and the like, and a memory 31. The memory 31 is a storage device that stores programs and data executed by the processor 21 in a nonvolatile manner, and includes a magnetic storage device, a semiconductor storage element such as a flash ROM, or another type of nonvolatile storage device, for example. The memory 31 may include a RAM that serves as a work area of the processor 21. The processor 21 may be a single processor or may have a configuration in which a plurality of processors serve as the processor 21.

The touch panel 51, the detection unit 55, and the wireless communication unit 60 are connected to the control unit 20. The touch panel 51 includes the display panel 52 and the touch sensor 53 described above, and the touch sensor 53 is connected to the detection unit 55. The detection unit 55 is connected to the touch sensor 53, a switch part 54, and a motion sensor 56, and serves as a unit for detecting a user operation on the terminal apparatus 10.

The display panel 52 includes a liquid crystal display, an Electro Luminescent (EL) display, and the like, and displays various information under the control of the control unit 20.

The touch sensor 53 is laminated over the surface of the display panel 52. The touch sensor 53 detects the contact of a finger or a pen-shaped indicator with respect to the touch panel 51, and outputs a position signal indicating the detected contact position to the detection unit 55. The detection unit 55 outputs coordinate data indicating the coordinates on the touch panel 51 to the control unit 20 based on the position signal input from the touch sensor 53.

The switch part 54 outputs an operation signal to the detection unit 55 in accordance with an operation of an operation piece disposed in the main body of the terminal apparatus 10, for example. The detection unit 55 outputs data corresponding to the operated operation piece to the control unit 20 based on the operation signal input from the switch part 54.

The motion sensor 56 is a sensor for detecting the movement of the main body 11 and is a so-called motion sensor. Examples of the motion sensor 56 may include an acceleration sensor, an angular velocity (gyro) sensor, and a geomagnetic sensor. For example, the motion sensor 56 includes single-axis, two-axis, or three-axis angular velocity sensors, and detects the acceleration in at least one axial direction of the X axis, the Y axis, and the Z axis shown in FIG. 1. Further, for example, the motion sensor 56 may include an angular velocity sensor for detecting an angular velocity around at least one of the X axis, the Y axis, and the Z axis shown in FIG. 1. In addition, the motion sensor 56 may include a uni-, bi-, or tri-axis geomagnetic sensor. Further, the motion sensor 56 may be configured as a sensor unit (IMU: Inertial Measurement Unit) integrating a plurality of the various sensors described above. For example, the motion sensor 56 may include a 9-axis sensor unit integrating a 3-axis acceleration sensor, a 3-axis angular velocity sensor, and a 3-axis geomagnetic sensor.

The motion sensor 56 outputs at least one of the detected value of the acceleration, the detected value of the angular velocity, and the detected value of the geomagnetism to the detection unit 55 as the detected value of the movement of the main body 11. The detection unit 55 outputs data indicating the detected value input from the motion sensor 56 to the control unit 20.

The wireless communication unit 60 (communication unit, second communication unit) includes an antenna, an RF circuit (not shown), and the like, and executes wireless communication under the control of the control unit 20. The communication method implemented by the wireless communication unit 60 is a wireless LAN (including Wi-Fi), Bluetooth, UWB, a wireless communication method using a mobile phone line, or the like, and not particularly limited. In the present embodiment, the wireless communication unit 60 communicates with the projector 100 by Wi-Fi.

The control unit 20 includes a display control unit 22, a communication control unit 23, an operation detection unit 24, a setting unit 25, an operation data processing unit 26, and a video output control unit 27, as functional blocks for controlling each unit of the terminal apparatus 10. These functional blocks are realized by the cooperation of software and hardware by the processor 21 executing the program stored in the memory 31. For example, the control unit 20 executes a control program 32 stored in the memory 31 to execute the operating system. The operating system serves as a platform for executing an application program 33 to be described below.

The memory 31 (storage unit) stores data processed by the control unit 20 and programs executed by the processor 21. For example, the memory 31 stores the control program 32, the application program 33, setting data 34, operation setting data 35, operation data 36, and video data 37.

The control program 32 is a program for the processor 21 to realize the functions of the display control unit 22, the communication control unit 23, the operation detection unit 24, the setting unit 25, the operation data processing unit 26, and the video output control unit 27. Further, some of these functions may be realized by the application program 33. The memory 31 may store a plurality of application programs 33. In this case, each of the plurality of application programs 33 may correspond to each functional block of the control unit 20. In addition, the application program 33 may be a program for realizing the function of the terminal apparatus 10 (not shown).

The terminal apparatus 10 may include a user interface including an icon corresponding to the application program 33 which allows the user to instruct to execute at least some of the application programs 33. In this case, the terminal apparatus 10 displays a graphical user interface including an icon on the touch panel 51 and executes the application program 33 in accordance with the operation on the icon.

The setting data 34 includes various setting values (parameters) defining the operation of the terminal apparatus 10. The setting data 34 includes parameters used in various processing such as a processing of the terminal apparatus 10 for generating an image, for example. In addition, the setting data 34 may include various data such as setting values related to the communication by the wireless communication unit 60. For example, the setting data 34 includes information on the projector 100 with which the terminal apparatus 10 communicates. Specifically, the setting data 34 may include the network address, identification information, other information, and the like of the projector 100. The setting data 34 includes information for the control unit 20 to detect an operation on the main body 11 based on data indicating the detected value of the motion sensor 56.

The operation setting data 35 includes information that is referenced when the operation data 36 is generated.

The operation data 36 includes information for designating the display position at which the projector 100 displays the pointer P using the image projection area PA as a reference. Specifically, the operation data 36 includes the coordinates of the pointer P in the coordinate system set in the image projection area PA. The coordinates of the pointer P may be either relative coordinates or absolute coordinates.

Figure 4:
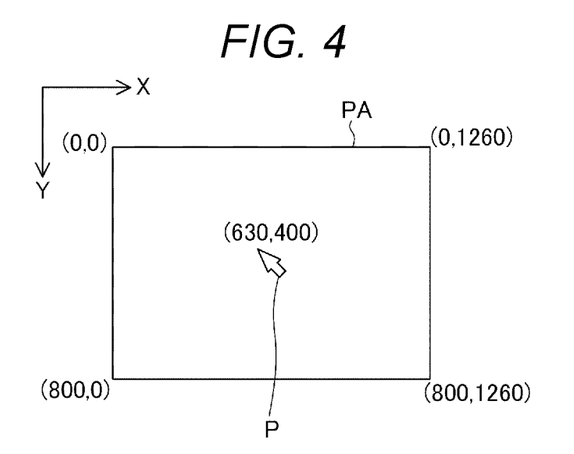
FIG. 4 is a diagram explaining operation data.
Figure 5:
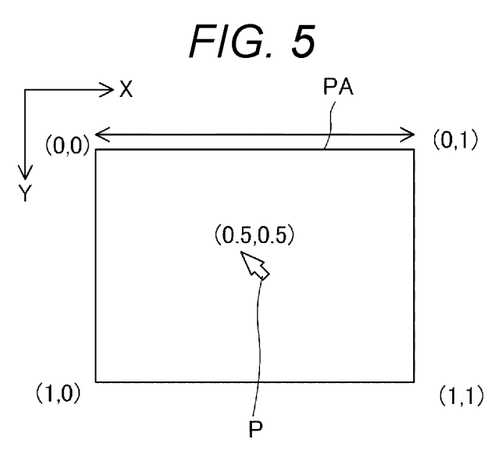
FIG. 5 is a diagram explaining operation data.

FIGS. 4 and 5 are diagrams explaining operation data 36. FIG. 4 shows an example in which the operation data 36 is composed of absolute coordinate data, and FIG. 5 shows an example in which the operation data 36 is composed of relative coordinate data.

FIGS. 4 and 5 show the representation of the position of the pointer P with respect to the image projection area PA. In this example, the image projection area PA is a rectangle, and an XY orthogonal coordinate system having the long side direction as the X axis and the short side direction as the Y axis is set. The upper left corner of the image projection area PA in the drawing is set as the origin, and the coordinates of the origin are set to (0, 0), the rightward direction in the drawing from the origin is set as the positive direction of the X axis, and the downward direction from the origin is set as the positive direction of the Y axis, although these are merely defined for the convenience of explanation and may be appropriately changed.

In the example of FIG. 4, the X coordinate range of the image projection area PA is set to 0 to 1260, the Y coordinate range of the image projection area PA is set to 0 to 800, and the position of the pointer P is represented by X-Y coordinates. That is, the operation data 36 is the coordinates of the pointer P, and is (630, 400) in the example of FIG. 4.

The example in FIG. 4 is applied when the projector 100 specifies the position of the pointer P in the image projection area PA by a coordinate system having an X coordinate range of 0 to 1260 and a Y coordinate range of 0 to 800. For example, it is applied when the display position of the pointer P is processed with absolute coordinates as shown in FIG. 4 so that the projector 100 displays the pointer P based on the coordinate data input from the pointing device. For example, the example of FIG. 4 corresponds to the case where the display resolution of the liquid crystal light valve or the DMD where the light modulation device 112 forms an image is 800 pixels in length×1260 pixels in width, for example. In this case, the projection control unit 132 of the projector 100 may set the display position of the pointer P as the coordinate of the operation data 36.

In the example of FIG. 5, the position of the pointer P is represented by X-Y coordinates when the range of the X coordinate of the image projection area PA is 0 to 1 and the range of the Y coordinate of the image projection area PA is 0 to 1. That is, the operation data 36 represents the position of the pointer P with respect to the entire image projection area PA with relative coordinates. In the example of FIG. 5, the operation data 36 is the coordinates (0.5, 0.5) and indicates the center position of the image projection area PA in the X axis direction and the Y axis direction.

The example of FIG. 5 may be applied irrespective of the display resolution and the number of pixels of the image projection area PA of the projector 100. The projection control unit 132 may quickly calculate the coordinates of the display position of the pointer P by multiplying the operation data 36 by the maximum value of coordinates or the number of pixels in the X axis direction and the Y axis direction of the image projection area PA.

It should be noted that, in this embodiment, while a configuration is illustrated, in which the image projection area PA on the screen SC onto which the projector 100 projects an image coincides with the area onto which the pointer P is projected, the invention is not limited thereto. For example, the projector 100 may be configured so that the pointer P can be displayed only on a part of the image projection area PA. In this case, the operation data 36 is data of absolute coordinates or relative coordinates in the area where the projector 100 displays the pointer P. In addition, the image projection area PA may not coincide with the area on which the image is rendered by the light modulation device 112.

As shown in FIG. 4, when the operation data 36 is absolute coordinate data, the terminal apparatus 10 refers to the resolution, the number of pixels, or the number of dots of the image projection area PA of the projector 100 in the process of generating the operation data 36.

As shown in FIG. 5, when the operation data 36 is relative coordinate data, the projector 100 may promptly calculate the position of the pointer P regardless of the specification of the projector 100. Therefore, the terminal apparatus 10 does not necessarily refer to the number of pixels or the number of dots of the image projection area PA of the projector 100 in the process of generating the operation data 36.

When the operation data 36 is absolute coordinate data, the operation setting data 35 (FIG. 3) includes information on the range in which the projector 100 displays the pointer P, and specifically, the operation setting data 35 includes the number of pixels and the number of dots of the image projection area PA. In addition, when the operation data 36 is relative coordinate data, the operation setting data 35 may not include the number of pixels or the number of dots of the image projection area PA.

Whether the operation data 36 is represented by relative coordinates or absolute coordinates is designated by information included in the setting data 34 or operation setting data 35.

The video data 37 is data for display that is transmitted to the projector 100 when the terminal apparatus 10 serves as a video source. The video data 37 is data for displaying video contents such as movies or data for displaying images, documents, and the like generated by the function of the application program 33, for example. The video data 37 may include audio data. In addition, the video data 37 may be data for the projector 100 to continuously display a still image or a moving image, and may be still image data.

The display control unit 22 drives the display panel 52 to display various screens on the display panel 52. For example, the display control unit 22 causes the display panel 52 to display a screen including an icon that forms the user interface of the terminal apparatus 10, a screen including the operation state or processing result of the terminal apparatus 10, or an image based on the video data 37.

The communication control unit 23 controls the wireless communication unit 60 to execute wireless communication. The communication control unit 23 controls the wireless communication unit 60 to establish wireless communication with the projector 100 according to the operation detected by the detection unit 55 and executes various data communications with the wireless communication unit 170 (FIG. 2).

The operation detection unit 24 detects an operation by the user based on the data input from the detection unit 55. The operation detection unit 24 detects the touch operation on the display panel 52 and specifies the operation position. In addition, the operation detection unit 24 detects operations of the respective operation pieces including the switches. Further, the operation detection unit 24 detects an operation to move the main body 11.

The operation detection unit 24 specifies the mode of movement of the main body 11 from the data indicating the movement and rotation of the main body 11. The mode of movement of the main body 11 includes orientation of the movement or rotation, amount of the movement, rate of the movement, amount of the rotation, rate of the rotation, and the like of the main body 11. The operation detection unit 24 determines whether or not the obtained information of the movement of the main body 11 satisfies the condition for detecting the operation using the main body 11, and detects the operation by the user when the obtained information corresponds to the condition. The condition for detecting the operation is included in the setting data 34, for example.

The setting unit 25 generates or sets the operation setting data 35 based on the information acquired from the projector 100 by the wireless communication unit 60. The setting unit 25 sets information designating whether the operation data 36 is relative coordinate data or absolute coordinate data, information on the image projection area PA where the projector 100 displays the pointer P, and the like in the operation setting data 35.

The operation data processing unit 26 calculates the display position of the pointer P corresponding to the operation detected by the operation detection unit 24 based on the operation setting data 35, and generates the operation data 36. The operation data processing unit 26 causes the wireless communication unit 60 to transmit the generated operation data 36 to the projector 100.

The video output control unit 27 (video output unit) outputs the video data 37 to the projector 100 when the terminal apparatus 10 operates as the video source of the projector 100. For example, the video output control unit 27 causes the wireless communication unit 60 to perform wireless data communication with the projector 100, and transmits the video data 37 or the video data for the projector 100 generated from the video data 37 to the projector 100.

1-4. Operation of Display System

Subsequently, the operation of the display system 1 will be described.

Figure 6:
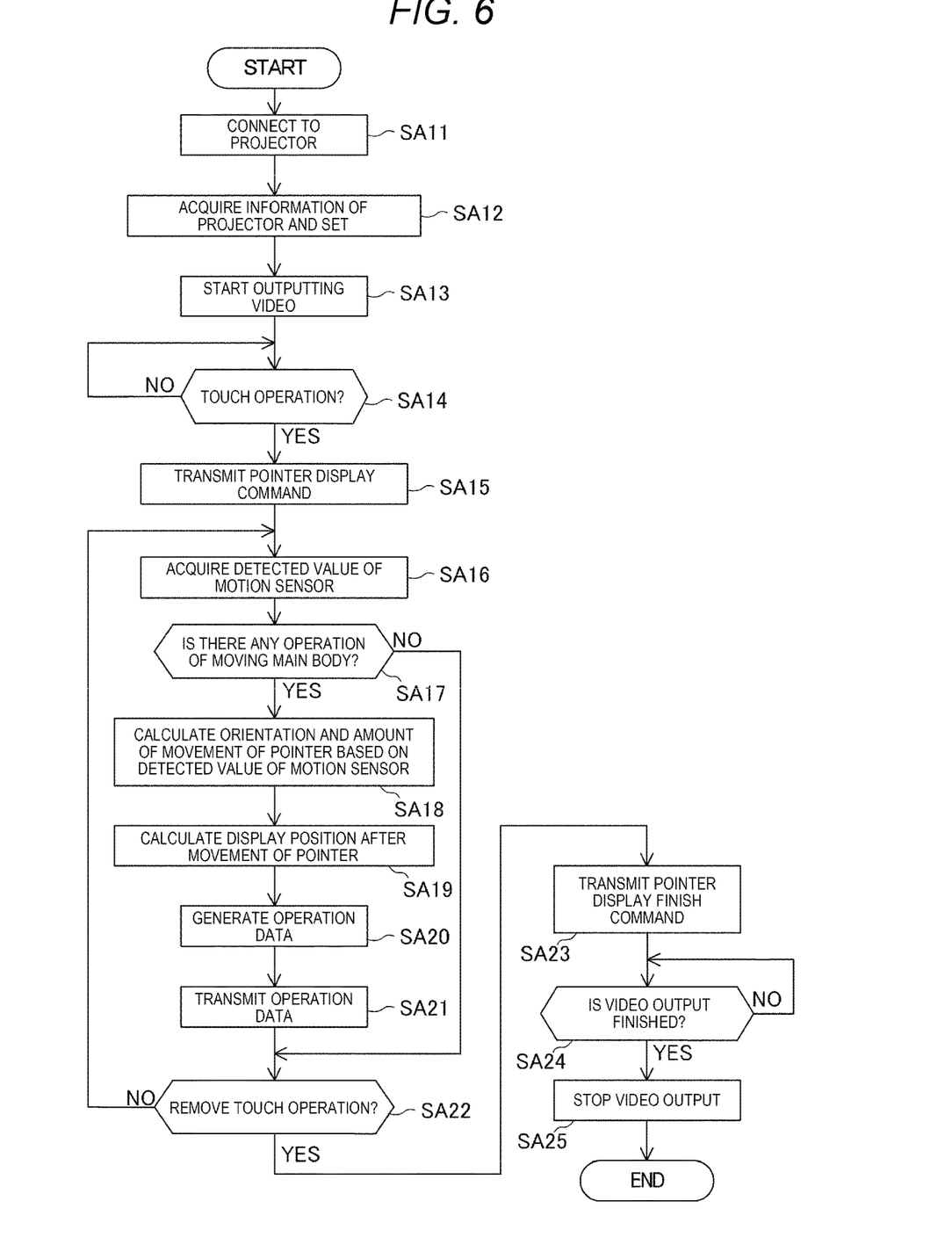
FIG. 6 is a flowchart showing an operation of a terminal apparatus.
Figure 7:
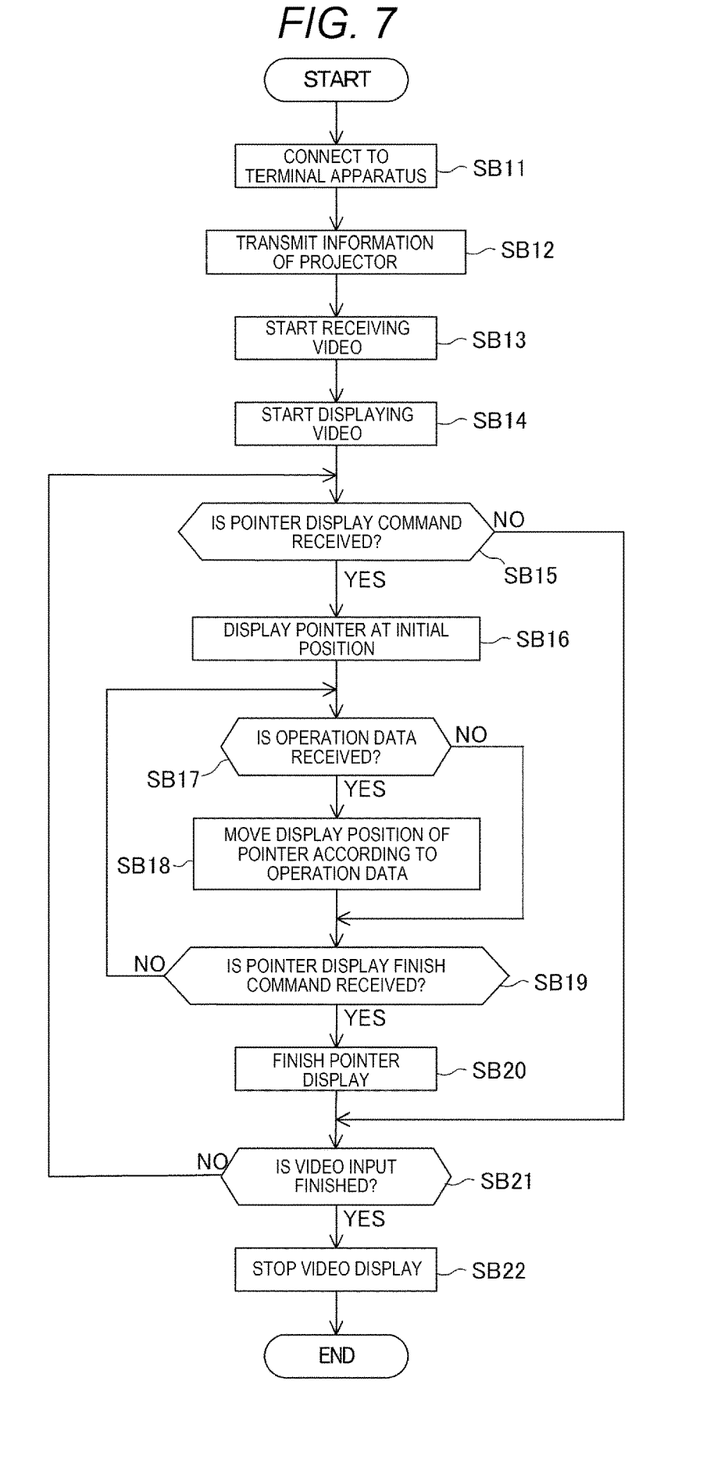
FIG. 7 is a flowchart showing an operation of a projector.

FIG. 6 is a flowchart showing the operation of the terminal apparatus 10, and FIG. 7 is a flowchart showing the operation of the projector 100.

First, the communication control unit 23 of the terminal apparatus 10 controls the wireless communication unit 60 to execute a predetermined communication protocol, to establish a wireless communication link with the wireless communication unit 170 included in the projector 100 and connect to the projector 100 (step SA 11). Subsequently, the setting unit 25 communicates with the projector 100 through the wireless communication unit 60 to acquire information on the projector 100, and sets the setting data 34 and the operation setting data 35 (step SA 12). In step SA 12, the setting unit 25 acquires the network address of the projector 100, the resolution of the video data receivable by the projector 100, and the like, and sets the acquired information in the setting data 34, for example. In addition, when the operation data processing unit 26 generates the operation data 36 based on the absolute coordinate data, the setting unit 25 acquires information such as the resolution and the number of pixels of the image projection area PA of the projector 100 in step SA 12, and sets the operation setting data 35.

Subsequently, the video output control unit 27 starts outputting the video data 37 to the projector 100 (step SA 13). Thereby, the terminal apparatus 10 operates as a video source of the projector 100, and the projector 100 displays the image based on the video data 37 outputted by the terminal apparatus 10 on the screen SC. Here, the video output control unit 27 may perform the process of converting the video data 37 and output the converted video data to the projector 100. For example, the video output control unit 27 may start the processing of converting the resolution, the frame rate, the gradation value, and the like of the video data 37 and the operation of outputting the processed video data to the projector 100, in step SA 13.

The operation detection unit 24 stands by for a touch operation by the user on the touch panel 51 (step SA 14). In step SA 14, the operation detection unit 24 determines presence or absence of a touch operation, and stands by while there is no touch operation (step SA 14; No). When it is determined that there is a touch operation (step SA 14; Yes), the operation data processing unit 26 causes the wireless communication unit 60 to transmit a pointer display command to the projector 100 (step SA 15). The pointer display command is a command instructing the projector 100 to start displaying the pointer P (FIG. 1).

Thereafter, the operation detection unit 24 acquires data indicating the detected value of the motion sensor 56 from the detection unit 55 (step SA 16), and determines whether or not an operation of moving the main body 11 is performed (step SA 17). The operation detection unit 24 determines that the operation is performed when the detected value acquired in step SA 16 corresponds to the condition of the setting data 34. The operation detected in step SA 17 is an operation of moving, tilting, or rotating the main body 11, for example.

When it is determined that the operation of moving the main body 11 is performed (step SA 17: Yes), the operation data processing unit 26 calculates the orientation of the movement and the amount of the movement of the display position of the pointer P based on the detected value acquired in step SA 16 (Step SA 18). Further, the operation data processing unit 26 calculates the display position after the movement of the pointer P based on the orientation of the movement and the amount of the movement calculated in step SA 18 (step SA 19). The operation data processing unit 26 generates the operation data 36 indicating the display position calculated in step SA 19 (step SA 20), causes the wireless communication unit 60 to transmit the operation data 36 to the projector 100 (step SA 21), and proceeds to step SA 22.

On the other hand, when it is determined that the operation of moving the main body 11 is not performed, based on the detected value of the motion sensor 56 (step SA 17; No), the operation detection unit 24 proceeds to step SA 22.

In step SA 22, the operation detection unit 24 determines whether or not the touch operation detected in step SA 14 is removed (step SA 22). When the state of the touch detected in step SA 14 is continuously maintained, the operation detection unit 24 determines that the operation is not removed (step SA 22; No) and returns to step SA 16. That is, while the state in which the user touches the touch panel 51 with his or her finger or hand is continuously maintained, the terminal apparatus 10 generates the operation data 36 in accordance with the operation of moving the main body 11.

When it is determined that the touch operation detected in step SA 14 is removed (step SA 22; Yes), the operation detection unit 24 proceeds to step SA 23.

The determination in step SA 22 may be performed by flow control as shown in FIG. 6, but the control unit 20 may also be operated by interruption control. For example, when the operation detection unit 24 monitors for a removal of the touch operation after step SA 14 and detects that the touch operation is removed, an interruption is generated, and in response to this interruption, the control unit 20 may proceed to step SA 23.

In step SA 23, the operation data processing unit 26 causes the wireless communication unit 60 to transmit a pointer display end command to the projector 100 (step SA23). The pointer display end command is a command instructing the projector 100 to end display of the pointer P.

In addition, the video output control unit 27 determines whether or not to stop the video output to the projector 100 (step SA 24). When it is determined not to stop the video output (step SA 24; No), the video output control unit 27 stands by. In addition, for example, when it is instructed to stop the video output by the operation on the touch panel 51, the video output control unit 27 determines that the video output is to be stopped (step SA 24; Yes), stops the output of the video data 37 (step SA 25), and ends this process.

Next, the operation of the projector 100 will be described.

The communication control unit 133 of the projector 100 controls the wireless communication unit 170 to execute a predetermined communication protocol to establish a wireless communication link with the wireless communication unit 60 of the terminal apparatus 10 and connect to the terminal apparatus 10 (Step SB 11). The communication control unit 133 causes the wireless communication unit 170 to transmit information on the projector 100 to the terminal apparatus 10 (step SB 12). In step SB 12, information such as the network address of the projector 100 requested by the terminal apparatus 10 in step SA 12 (FIG. 6), the resolution of the video data receivable by the projector 100, the resolution, the number of pixels of the image projection area PA, and the like are transmitted.

The communication control unit 133 starts receiving the video data transmitted from the terminal apparatus 10 (step SB 13), and temporarily stores the video data in the memory 141 as the video data 144. When video data is streamed from the terminal apparatus 10, the memory 141 serves as a buffer and temporarily stores the received video data.

The projection control unit 132 starts projecting the video onto the screen SC based on the video data started to be received in step SB13 (step SB 14).

At this time, the projection control unit 132 determines whether or not a pointer display command is received from the terminal apparatus 10 (step SB 15). When the pointer display command is received (step SB 15; Yes), the projector 100 switches the operation mode from the first operation mode to the second operation mode. That is, the projection control unit 132 displays the pointer P at an initial position superimposed on the video being displayed based on the video data received from the terminal apparatus 10 (step SB 16). The initial position of the pointer P may be a preset position or a position designated by the pointer display command, such as the center of the image projection area PA.

Subsequently, the projection control unit 132 determines whether or not operation data is received from the terminal apparatus 10 (step SB 17). When the operation data is received (step SB 17; Yes), the projection control unit 132 determines the display position of the pointer P according to the operation data and moves the pointer P (step SB 18).

As described above, when the operation data transmitted from the terminal apparatus 10 is the relative coordinate data, the projection control unit 132 converts the relative coordinates to the coordinates in accordance with the image projection area PA and determines the position of the pointer P, in step SB 18. If the operation data is absolute coordinate data, the projection control unit 132 sets the operation data as the position of the pointer P, in step SB 18.

The projection control unit 132 determines whether or not a pointer display end command is received (step SB 19). When the pointer display end command is not received (step SB 19; No), the projection control unit 132 returns to step SB 17.

In addition, when the projection control unit 132 determines that the operation data is not received from the terminal apparatus 10 (step SB 17; No), the projection control unit 132 proceeds to step SB 19 without performing the process of step SB 18.

When the projection control unit 132 determines that the pointer display end command is received (step SB 19; Yes), the projection control unit 132 ends the display of the pointer P (step SB 20). Thereby, the projector 100 ends the second operation mode and proceeds to the first operation mode.

Subsequently, the projection control unit 132 determines whether or not the input of the video data from the terminal apparatus 10 is finished (step SB 21), and when the input is not finished (step SB 21; No), the projection control unit 132 returns to step SB 15. When the input of the video data from the terminal apparatus 10 is finished (step SB 21; Yes), the display of the video on the screen SC is finished (step SB 22), and the present process is finished.

As described above, the display system 1 of the present embodiment is a system including the projector 100 and the terminal apparatus 10. The terminal apparatus 10 includes the wireless communication unit 60 that communicates with the projector 100, and the operation detection unit 24 that detects an operation. The terminal apparatus 10 includes the operation data processing unit 26 that causes the wireless communication unit 60 to transmit the operation data to the projector 100 based on the operation detected by the operation detection unit 24. The operation data is operation data for designating the display position of the pointer P when the projector 100 displays the pointer P according to the operation of the pointing device. The projector 100 includes the projection unit 110 and the wireless communication unit 170 that receives the operation data transmitted from the terminal apparatus 10. The projector 100 includes the projection control unit 132 that causes the projection unit 110 to display a pointer P indicating the operation position of the pointing device based on the operation data received by the wireless communication unit 170.

According to the electronic apparatus, the display system, the control method of the electronic apparatus, and the terminal apparatus 10 applying the program according to the invention, the terminal apparatus 10 transmits the operation data for designating the display position of the pointer P displayed by the projector 100 to the projector 100. Therefore, the projector 100 can easily specify the display position of the pointer P based on the operation data transmitted from the terminal apparatus 10. Accordingly, it is possible to suppress the load of the processing for the projector 100 to display the pointer P. As a result, according to the display system 1, the operation of moving the display position of the pointer P corresponding to the operation of the terminal apparatus 10 can be realized while suppressing the processing load of the projector 100.

For example, in the configuration in which the projector 100 calculates the display position of the pointer P corresponding to the user's operation, the processing load of the projector 100 is considerably large. In this case, it is necessary for the projector 100 to obtain the orientation of the movement and the amount of the movement of the pointer P corresponding to the operation of moving the main body 11, and calculate the coordinates of the display position of the pointer P corresponding to the obtained orientation and amount of the movement. In addition, it is necessary to receive and analyze the data indicating the operation of the user from the terminal apparatus 10. For example, it is necessary for the projector 100 to receive the detected value of the motion sensor 56 from the terminal apparatus 10 and determine whether or not an operation of moving the main body 11 is performed. In addition, since the frequency of data communication and the amount of communication performed by the terminal apparatus 10 and the projector 100 to perform this analysis are not small, the processing load for communication is also increased. In contrast, in the display system 1, since the terminal apparatus 10 generates operation data indicating the display position of the pointer P and transmits the operation data to the projector 100, the processing load of the projector 100 and the load of communication between the terminal apparatus 10 and the projector 100 can be reduced.

In the terminal apparatus 10, the operation data processing unit 26 obtains the display position after the movement of the pointer P corresponding to the operation detected by the operation detection unit 24. The operation data processing unit 26 causes the wireless communication unit 60 to transmit the operation data related to the movement of the projector 100 of the pointer P. Thus, when moving the pointer P in accordance with the movement of the terminal apparatus 10, the terminal apparatus 10 obtains the display position after the movement, and transmits the operation data to the projector 100. With this configuration, when moving the display position of the pointer P, the projector 100 can obtain the display position after the movement from the operation data. As a result, the load of the processing for the projector 100 to move the display position of the pointer P can be further reduced.

The operation data processing unit 26 obtains the display position after the movement of the pointer P corresponding to the operation detected by the operation detection unit 24 based on the setting value related to the image projection area PA which is the area where the projector 100 displays the pointer P. That is, the operation data processing unit 26 generates the operation data 36 which is absolute coordinate data, and transmits the operation data 36 to the projector 100. The setting value related to the image projection area PA is included in the operation setting data 35. As a result, the terminal apparatus 10 is enabled to obtain the display position of the pointer P corresponding to the image projection area PA of the projector 100. In this case, since the projector 100 may simply display the pointer P in accordance with the operation data, the load of the processing of the projector 100 can be further reduced.

The terminal apparatus 10 includes the memory 31 for storing setting values of an area where the projector 100 displays the pointer P and the setting unit 25 for setting the operation setting data 35 stored in the memory 31. The operation data processing unit 26 obtains the display position after the movement of the pointer P corresponding to the operation detected by the operation detection unit 24 based on the operation setting data 35 stored in the memory 31. As a result, the terminal apparatus 10 is enabled to easily obtain the display position of the pointer P corresponding to the image projection area PA of the projector 100.

The operation data processing unit 26 causes the wireless communication unit 60 to transmit the operation data indicating the display position after the movement of the pointer P. As a result, the projector 100 can easily obtain the display position after the movement of the pointer P from the operation data. Therefore, the projector 100 can promptly move the display position of the pointer P.

The terminal apparatus 10 includes the video output control unit 27 that outputs video to the projector 100. In this case, the terminal apparatus 10 serves as a video source of the projector 100. With this configuration, when the video output from the terminal apparatus 10 and the pointer P are displayed by the projector 100, the load on the projector 100 can be suppressed.

In addition, the operation data processing unit 26 may cause the wireless communication unit 60 to transmit the operation data indicating the amount and the orientation of the movement of the display position of the pointer P. In other words, the operation data 36 is neither the relative coordinate data nor the absolute coordinate data but may be operation data indicating the amount and the orientation of the movement for moving the display position of the pointer P before the movement. In this case, the projector 100 may easily obtain the amount and the orientation of the movement of moving the display position of the pointer P from the operation data. Therefore, the load of the processing for the projection control unit 132 to obtain the display position of the pointer P after the movement can be reduced.

2. Second Embodiment

Subsequently, a second embodiment applying the invention will be described.

In the second embodiment, an external device other than the terminal apparatus 10 is connected to the projector 100 as a video source.

The operation of the terminal apparatus 10 in the second embodiment is the operation shown in the flowchart of FIG. 6 excluding steps SA 13, SA 24, SA 25. Since the other operations are the same as those in FIG. 6, illustration and description of these will not be repeated.

Figure 8:
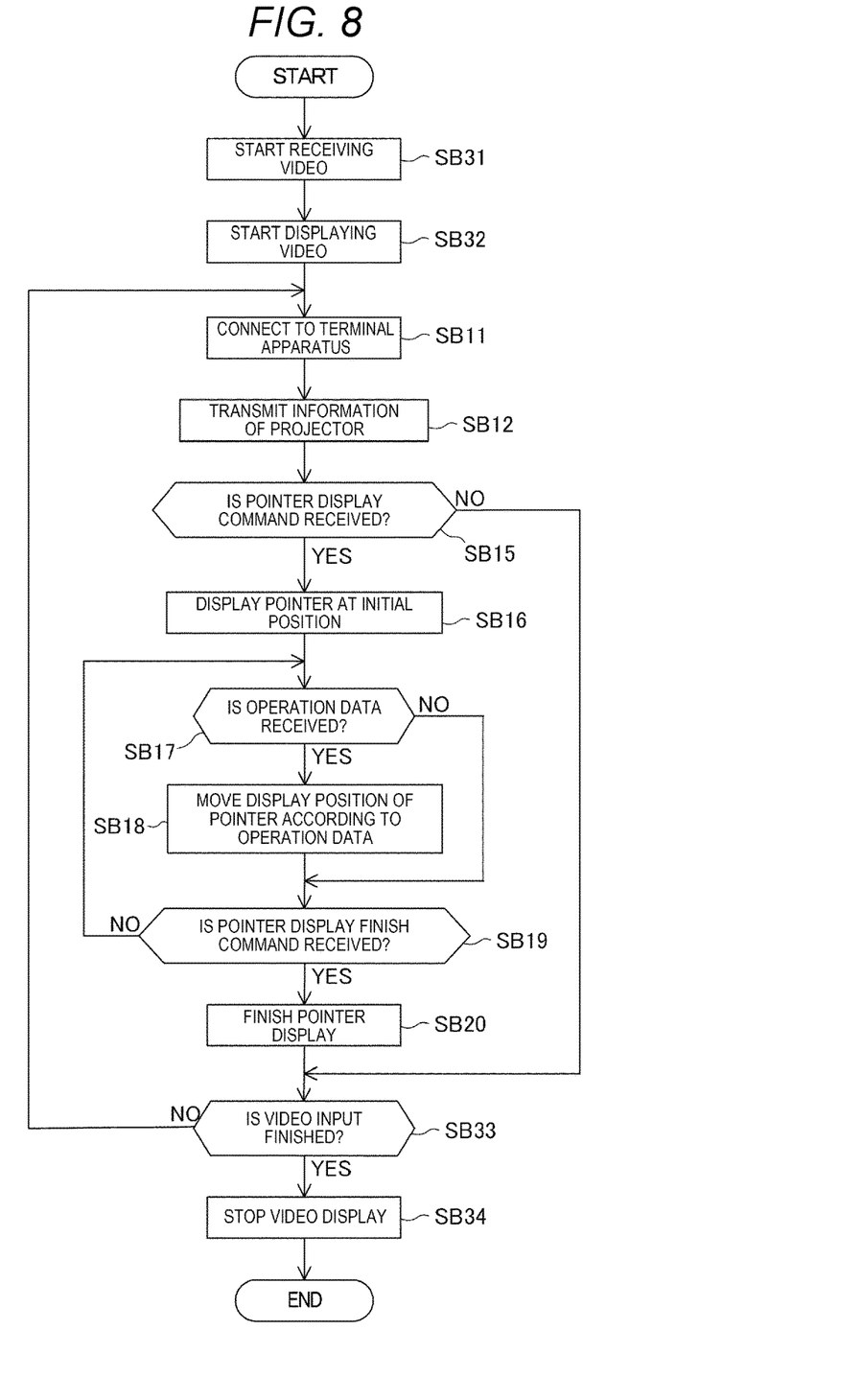
FIG. 8 is a flowchart showing an operation of a projector according to a second embodiment.

FIG. 8 is a flowchart showing the operation of the projector 100 according to the second embodiment. In the flowchart of FIG. 8, the same steps as those in FIG. 7 are denoted by the same step numbers, and a description thereof will not be repeated.

The communication control unit 133 starts receiving the video data transmitted from an external video source (step SB 31), and temporarily stores the video data in the memory 141 as the video data 144. When the video data is streamed, the memory 141 operates as a buffer and temporarily stores the received video data.

The projection control unit 132 starts projecting the video onto the screen SC based on the video data started to be received in step SB 31 (step SB 32).

When the communication control unit 133 and the projection control unit 132 perform the operations of steps SB 13 to SB 15 to receive the pointer display command (step SB 15; Yes), the projection control unit 132 displays the pointer P at the initial position (step SB 16). In step SB 16, the projection control unit 132 displays a video based on the video data received from the external video source. Therefore, in step SB 16, the projection control unit 132 superimposes the pointer P on the video being displayed, and displays the pointer P based on the video data received from the external video source.

Thereafter, the control unit 130 executes the operations of steps SB 17 to SB 20.

After ending the display of the pointer P in step SB 20 and when determining that the pointer display command is not received in step SB 15, the projection control unit 132 determines whether or not the input of the video data from the video source is finished (Step SB 33).

When the input is not finished (step SB 33; No), the process returns to step SB 15. When the input of the video data from the video source is finished (step SB 33; Yes), the display of the video on the screen SC is finished (step SB 34), and the present process is finished.

In the second embodiment, the pointer P is displayed while the projector 100 displays a video based on a video source other than the terminal apparatus 10. The projector 100 may move the display position of the pointer P in accordance with the operation of moving the terminal apparatus 10.

With this configuration, likewise the first embodiment, it is possible to suppress the processing load of the projector 100 when the display position of the pointer P is moved in accordance with the operation of the terminal apparatus 10.

It is to be noted that each of the embodiments described above shows one specific example that applies the invention, and the invention is not limited thereto.

For example, in the embodiments described above, the display position of the pointer P is designated by relative coordinates or absolute coordinates in the X-Y orthogonal coordinate system in the image projection area PA. In other words, the example in which the projector 100 can specify the display position of the pointer P by the plane coordinates in the plane of the image projection area PA is described above. The invention is also applicable to a case where the projector 100 displays three-dimensional (3D) videos. In this case, the projector 100 may be configured to determine the position of the pointer P by three-dimensional coordinates including a direction perpendicular to the image projection area PA. For example, when three-dimensional coordinates are designated as the display position of the pointer P, the control unit 130 generates 3D video data for displaying the pointer P at the designated coordinates. In this case, the operation data processing unit 26 of the terminal apparatus 10 may calculate the orientation and the amount of the movement, generate the operation data 36 and transmit the operation data 36 to the projector 100 when the three-dimensional coordinates of the pointer P or the pointer P is moved in response to the operation of moving the main body 11. Also in this case, likewise the first and second embodiments, it is possible to suppress the processing load for the projector 100 to move the display position of the pointer P corresponding to the operation of the terminal apparatus 10.

In each of the embodiments described above, the case where the display position of the pointer P is moved corresponding to the operation of moving the main body 11 while the user is performing the touch operation on the touch panel 51 is described by way of an example, but, the invention is not limited to this. For example, after the user operates the touch panel 51 to instruct the start of the second operation mode, even when the touch operation on the touch panel 51 is removed, the operation of moving the display position of the pointer P may be continued. In addition, an operation method of moving the display position of the pointer P by a touch operation on the touch panel 51 other than the operation of moving the main body 11 may be adopted. For example, the terminal apparatus 10 may determine the display position of the pointer P based on the operation position where the touch operation is performed on the touch panel 51.

In addition, for example, in the embodiments described above, the projector 100 is shown as an example of a display apparatus, but the display apparatus according to the invention may be a liquid crystal monitor, a liquid crystal television, or the like for displaying an image on a liquid crystal display panel. Further, the display device according to the invention may be an apparatus including an organic EL display panel such as a plasma display panel, an organic light-emitting diode (OLED), an organic electro luminescence (OEL) display.

In addition, in the embodiment described above, as an example of the electronic apparatus, the portable terminal apparatus 10 having the flat plate-shaped main body 11 and being operated while being held in the hand of the user is described as an example, but the invention is not limited thereto. For example, a portable game machine, a portable replay apparatus for playing back music or video, a smartphone, and the like may be used as the terminal apparatus 10. Furthermore, the indicator such as a pen or a finger is described as an example of the means for operating the terminal apparatus 10, but the invention is not limited thereto, and for example, a configuration may be contemplated in which operating is performed using a pointing device such as a mouse.

In addition, each functional unit shown in FIGS. 2 and 3 shows a functional configuration, and the specific form of implementation is not particularly limited. That is, it is not always necessary to implement hardware corresponding to each functional unit individually, but it is also possible to realize the function of a plurality of functional units by one processor executing a program. In addition, some of the functions realized by software in the above embodiment may be realized by hardware, or some of functions realized by hardware may be realized by software. In addition, specific detailed configurations of the other parts of the terminal apparatus 10 and the projector 100 forming the display system 1 can be appropriately modified without departing from the gist of the invention.

What is claimed is:

1. An electronic apparatus comprising:
   a communication unit that communicates with a display apparatus; and
   a processor programmed to
      cause the communication unit to communicate with the display apparatus to acquire information of the display apparatus;
      set a setting value based on the information of the display apparatus;
      detect an operation of a pointing device;
      cause the communication unit to transmit operation data to the display apparatus based on the operation, the operation data being data for designating a display position of a pointer displayed by the display apparatus according to the operation; and
      obtain the display position after a movement of the pointer corresponding to the operation based on the setting value.

2. The electronic apparatus according to claim 1, wherein the processor obtains a display position after a movement of the pointer corresponding to the operation, and causes the communication unit to transmit the operation data relating to the movement of the pointer on the display apparatus.

3. The electronic apparatus according to claim 2, wherein the processor obtains the display position after the movement of the pointer corresponding to the operation, based on a setting value of an area in which the display apparatus displays the pointer.

4. The electronic apparatus according to claim 3, further comprising:

a memory that stores the setting value of the area in which the display apparatus displays the pointer,
wherein the processor stores the setting value in the memory, and
obtains the display position after the movement of the pointer corresponding to the operation, based on the setting value stored in the memory.

5. The electronic apparatus according to claim 2,
wherein the processor causes the communication unit to transmit the operation data indicating an amount and an orientation of the movement of the display position of the pointer.

6. The electronic apparatus according to claim 2,
wherein the processor causes the communication unit to transmit the operation data indicating the display position after the movement of the pointer.

7. The electronic apparatus according to claim 1, wherein:
the processor outputs a video to the display apparatus.

8. The electronic apparatus according to claim 1,
wherein the processor sets the setting value designating whether the operation data is relative coordinate data or absolute coordinate data.

9. The electronic apparatus according to claim 1,
wherein the information of the display apparatus represents the resolution of a display area which is the maximum area where the display apparatus can display.

10. The electronic apparatus according to claim 1,
wherein the information of the display apparatus represents the number of pixels of a display area which is the maximum area where the display apparatus can display.

11. A display system comprising:
a display apparatus; and
an electronic apparatus,
wherein the display apparatus includes
a display unit,
a first communication unit that receives operation data transmitted from the electronic apparatus, and
a first processor that causes the display unit to display a pointer indicating an operation position of a pointing device, based on the operation data received by the first communication unit, and
the electronic apparatus includes
a second communication unit that communicates with the display apparatus,
a second processor programmed to
cause the communication unit to communicate with the display apparatus to acquire information of the display apparatus;
set a setting value based on the information of the display apparatus;
detect an operation of a pointing device;
cause the communication unit to transmit operation data to the display apparatus based on the operation, the operation data being data for designating a display position of a pointer displayed by the display apparatus according to the operation; and
obtain the display position after a movement of the pointer corresponding to the operation based on the setting value.

12. A control method of an electronic apparatus that communicates with a display apparatus, the method comprising:
acquiring information of the display apparatus;
setting a setting value based on the information of the display apparatus;
detecting an operation;
transmitting operation data to the display apparatus based on the detected operation, the operation data being data for designating a display position of a pointer displayed by the display apparatus according to an operation of a pointing device; and
obtaining the display position after a movement of the pointer corresponding to the operation based on the setting value.

* * * * *